United States Patent
Weissman et al.

(10) Patent No.: US 12,026,131 B2
(45) Date of Patent: Jul. 2, 2024

(54) PARALLEL TRAVERSAL OF A FILESYSTEM TREE

(71) Applicant: VAST DATA LTD., Tel Aviv (IL)

(72) Inventors: Asaf Weissman, Tel Aviv (IL); Or Dahan, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 150 days.

(21) Appl. No.: 17/304,111

(22) Filed: Jun. 14, 2021

(65) Prior Publication Data
US 2022/0398225 A1      Dec. 15, 2022

(51) Int. Cl.
*G06F 17/00*      (2019.01)
*G06F 7/00*       (2006.01)
*G06F 16/18*      (2019.01)
*G06F 16/185*     (2019.01)

(52) U.S. Cl.
CPC ........ *G06F 16/185* (2019.01); *G06F 16/1858* (2019.01)

(58) Field of Classification Search
CPC .......................... G06F 16/185; G06F 16/1858
USPC ........................................................ 707/829
See application file for complete search history.

(56) References Cited

U.S. PATENT DOCUMENTS

| | | | | |
|---|---|---|---|---|
| 5,893,086 A * | 4/1999 | Schmuck | ............ | G06F 11/1435 707/999.001 |
| 5,940,841 A * | 8/1999 | Schmuck | ............ | G06F 16/1858 707/999.205 |
| 8,892,531 B2 | 11/2014 | Kaplan et al. | | |
| 2002/0111929 A1* | 8/2002 | Pudipeddi | ......... | G06F 16/90348 707/E17.106 |
| 2004/0003353 A1* | 1/2004 | Rivera | ................... | G06Q 10/10 715/255 |
| 2007/0024919 A1* | 2/2007 | Wong | ................... | G06F 9/5038 358/1.15 |
| 2011/0040810 A1* | 2/2011 | Kaplan | .................. | G06F 16/11 707/822 |
| 2014/0282585 A1* | 9/2014 | Dictos | ................. | G06F 16/1858 718/104 |
| 2014/0372384 A1* | 12/2014 | Long | ....................... | G06F 16/10 707/679 |
| 2021/0026825 A1* | 1/2021 | Gupta | ................ | G06F 16/2365 |

* cited by examiner

*Primary Examiner* — Pavan Mamillapalli
(74) *Attorney, Agent, or Firm* — RECHES PATENTS (57) ABSTRACT

A method for traversal of a filesystem tree, the method may include traversing the filesystem tree by multiple processing entities of a set of processing entities that belong to a storage system; wherein the traversing comprises multiple iterations of on-the fly allocation of workload, associated with parallel traversing of the filesystem tree, among the multiple processing entities; wherein a current iteration of the on the fly allocation is (a) executed by a current group of processing entities that are currently assigned to traverse current nodes of the filesystem tree, and (b) comprises re-allocating by the current group, a traversal task for traversing one or more child nodes of each of the current nodes of the filesystem tree, to a next group of processing entities; wherein the current group and the next group belong to the set.

21 Claims, 5 Drawing Sheets

FIG. 3A

PARALLEL TRAVERSAL OF A FILESYSTEM TREE

TECHNICAL FIELD

The present disclosure generally relates to the field of data storage, and more particularly to parallel traversal of a filesystem tree.

BACKGROUND

Various filesystem operations involve traversing a directory tree that represents the filesystem. Such filesystem operations include searching the entire directory tree of the filesystem (or a part thereof), and taking action based on the files or directories that are found. To walk a filesystem, the contents of the root directory is read, and the traversing continues down the tree, by accessing directories residing under the root directory, and then accessing directories branching out from these directories, until reaching directories at the bottom of the tree that do not include further directories.

The content of each directory down the tree is read, a required filesystem operation is applied on the files and/or directories stored in that directory, for example: back up of the files or backup of files that meet certain criteria, migration of files, listing of filenames and directory names according to certain user criteria, etc.

Traversing a filesystem may utilize a Depth-first search (DFS), which is an algorithm that starts at the root directory and explores as down as possible along each branch before backtracking to the next path branching from the root.

Modern filesystems allow to manage large volumes of data, with numerous files stored in a single file system. Extremely large file systems may count many millions and billions of files.

Traversing extremely large filesystems can impose a heavy processing load on the processing node, and therefore the corresponding filesystem operation that requires directory traversal can take too long to complete.

There is a growing need to provide an efficient method for traversal of a filesystem tree.

SUMMARY

There may be provide a storage system, a method and a non-transitory computer readable medium for traversal of a filesystem tree.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The present system, method and non-transitory computer readable medium are for performing a parallel Depth-first search (DFS), by distributing the traversal of a filesystem tree among multiple compute nodes, in order to accelerate the traversal and to balance the workload, without needing to know the structure of the directory tree and without needing to explore this structure prior to starting the traversal and prior to balancing the workload, where the tree may have an unbalanced structure and an unknown depth, while maintaining a minimal communication among the participating compute nodes. The tree traversal is performed as part of performing a requested filesystem operation on files and directories, that requires scanning the hierarchy of the filesystem.

The traversal is performed in a parallel iterative manner. Upon each iteration and during a traversal of a branch that was assigned to a compute node, when the compute node reaches a certain tree-node (i.e., a directory), it reassigns the work revealed by examining the number of branches that branches out of this tree node, i.e., the number of directories hosted in the current directory. The parallelism is achieved by the reassignment of sub-directories to various compute nodes that continue, concurrently, iterating the reassignment of lower parts of the branch assigned to them.

A set of compute nodes is selected for performing the filesystem traversal. The set of the compute nodes may include all the compute nodes belong to a storage system, or part of the compute nodes. In the following examples three compute nodes share the traversal, however, the number of compute nodes may reach thousands, tens thousands, and more. The examples refer to compute nodes, but may be applicable to compute cores within the same or different compute nodes. All the compute nodes have access to the filesystem upon which the filesystem operation and the traversal are performed, therefore the filesystem can be regarded as a shared filesystem.

A first compute node of the set of compute nodes is assigned to start the filesystem traversal, by assigning an identifier of the root directory of the filesystem tree to a task queue of the first compute node. For example, in FIG. 1, the root directory of a filesystem directory tree 100 is identified as '101', and the identifier of root directory 101 is assigned to the task queue of the first compute node. The identifier of the assigned directory 101 in the task queue may be an inode of the directory, a handle of the directory, or any other identifier that identifies the directory node within the tree.

Figure 1:
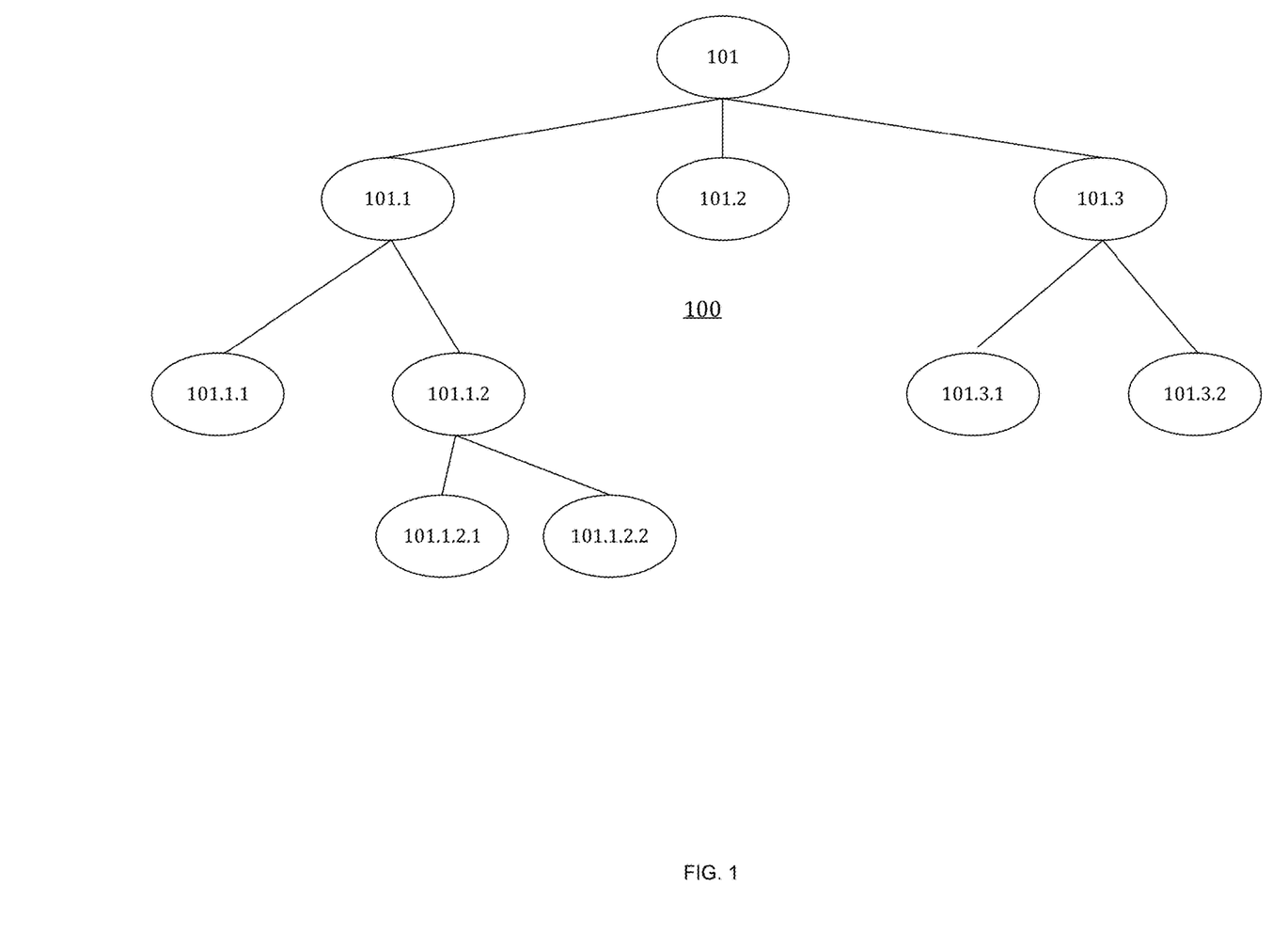
FIG. 1 illustrates an example of a filesystem tree.

The first compute node examines the content of directory 101, and identifies that directory 101 includes directories 101.1-101.3. The first compute node selects another member of the set of compute nodes, e.g., a second compute node, and checks whether the selected compute node is suitable for additional work. If the second compute node is suitable, the first compute node assigns the directory 101.1 to the second compute node. In the same manner, the first compute node assigns directory 101.2 to a third compute node.

In addition to reassigning the next branches, the first compute node performs a task on the files within the directory 101, according to the requested filesystem operation, for example, copying the files, copying files that meet a criterion, listing the filenames, back up of the files or backup of files that meet certain criteria, migration of files, listing of filenames and directory names according to certain user criteria, etc.

Given the large amount of compute nodes participating in the traversal, the first compute node may select the other compute nodes in a random manner, so as to evenly distribute the work assignment using the statistical approach.

The checking of whether the selected compute node is suitable for additional work may include determining whether the selected compute node is not overloaded. For example, the node may be considered as not overloaded if the queue length (or the number of assignments in the queue) is below a certain threshold. Although the number of assignments in the queue may not predict the amount of work involved in each assigned branch (since the branches may have different depths and different directories that vary in their content), this potential imbalance is resolved when a re-balance is triggered upon each iteration performed by each compute node upon reaching the next tree-node.

The assigning of directories to compute nodes is done by accessing a shared memory that is accessible to all the nodes. For example, a non-volatile memory, such as one of the NVRAM memories that is included in one of the storage nodes of FIG. 3A. The task queues may be stored in a non-volatile memory of one or more of the storage nodes, and are accessible to all the compute nodes.

After assigning directories 101.1 and 101.2 to other compute nodes, the first compute node marks the next route in its queue as 101.3, i.e., a branch below the directory that was handled in the current iteration, that was not reassigned to other compute nodes.

Figure 2A:
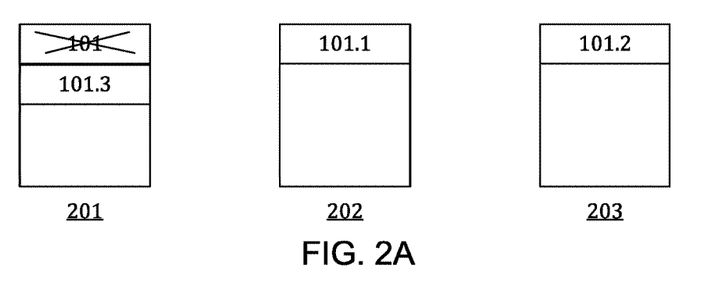
FIGS. 2B-2D illustrate examples of queue of compute node during different phases of a traversal of the filesystem tree of FIG. 1.
FIG. 2E illustrates an example of a method.

FIG. 2A illustrates task queues 201, 202 and 203 of the first, second and third compute nodes, after the first compute node handles the root directory, i.e., after reassigning the branches 101.1-101.3 that are under the root.

Initially, directory 101 was assigned to the first compute node. After reassigning all the directory under directory 101, directory 101 can be removed from queue 201 (illustrated with a strikethrough). Queue 202 of the second compute node includes directory 101.1 and queue 203 of the third compute node includes directory 101.2.

Referring now to the next step of the second compute node. Queue 202 of the second compute node includes the next branch, 101.1 to be handled by the second compute node. The second compute node reads the content of directory 101.1, which includes directories 101.1.1 and 101.1.2. The second compute node performs steps that are similar to the steps previously performed by the first compute node: The second compute node examines the content of directory 101.1, and identifies that directory 101.1 includes directories 101.1.1 and 101.1.2. The second compute node selects another member of the set of compute nodes, e.g., the third compute node, and checks whether the selected compute node is not overloaded. If the third compute node is not overloaded, it assigns one of the directories, e.g., 101.1.1 to the third compute node.

In addition to reassigning the next branches, the second compute node performs a task on the files within the directory 101.1 according to the requested filesystem operation. The second compute node can now delete directory 101.1 from its queue, and adds the branch that was not reassigned, e.g., the branch that starts with directory 101.1.2.

The second compute node continues with handling directory 101.1.2 in the same manner, i.e., reassigning directories 101.1.2.1 and 101.1.2.2, and the third compute node continues with handling directory 101.1.1 in the same manner, i.e., checking whether there are more branches under 101.1.1 to reassign.

Figure 2B:
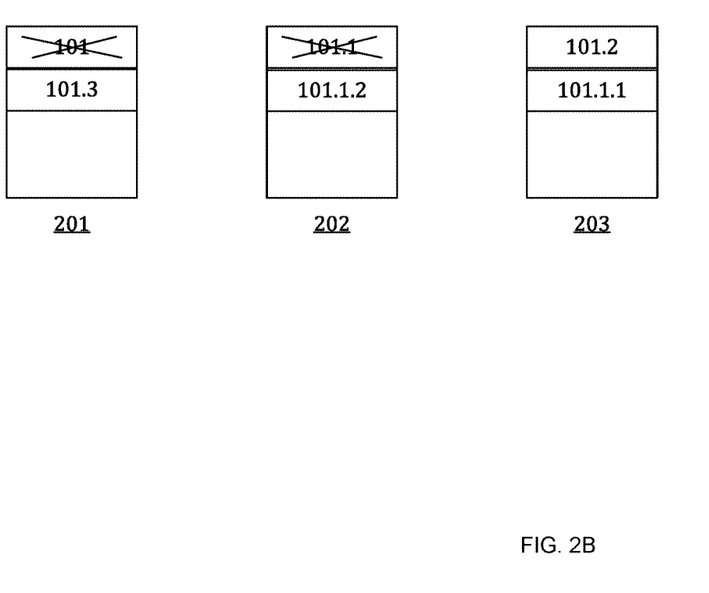

FIG. 2B illustrates the task queues after the reassigning of the directories under 101.1 that was under the responsibility of the second compute node. The directory 101.1 is illustrated with a strikethrough to indicate it was already handled. The second compute node continues with the branch under 101.1.2 that is assigned in its queue 202, while queue 203 of the third compute node is now assigned with branch 101.1.1 in addition to the directory 101.2, which in this example is still in queue 203 of the third compute node, which may happen if this directory is still being handled by the third compute node. This asymmetric may be caused, for example, if the content of directory 101.2 is larger than the content of directory 101.1 which handling was completed by the second compute node, or if the compute power of the third compute node is lower than the compute power of the second compute node.

A monitoring is being performed for detecting when the traversing is completed. The monitoring may be handled by one of the compute nodes, for example, by the compute node that initiated the traversal, i.e., the compute node that was assigned with the root directory.

The process of traversing the tree is completed when all the compute nodes are idle, or—in other words, when all the queues are empty. However, a specific compute node can be idle when it reaches the bottom of the branch or branches that was assigned to its queue, but it can still be assigned with more branches after it became temporarily idle.

Constantly polling all the queues is involved with excess accesses to the shared memory. In order to avoid the excess accesses, each compute node handles a reassignment indication that indicates whether it reassigned branches since the last polling.

Suppose a polling for determining a traversal completion is performed periodically. At a certain polling iteration, part of the queues are empty and at least one queue is not empty. In the next polling iteration, the at least one queue is checked, and if it is empty, a check is performed on the reassignment indication associated with the relevant compute node. If the reassignment indication indicates that no reassignment was performed since the previous polling, it can be determined that the traversal is over, otherwise—there is a need to check again if there is at least one other compute node that has a non-empty queue.

The reassignment indicator may assist in a case where a computer node that was active (queue not empty) during a previous iteration is now empty. If this computer node issued a reassignment after the previous iteration—then the current iteration should check whether the reassignment was completed or not. The reassignment indication may assist in determining whether there is a need to check the states of queues (all or some of the queues) in a current iteration. Each iteration may be executed based on a status of the previous iteration—for example starting to check queues that were not empty during the previous iteration.

Figure 2C:
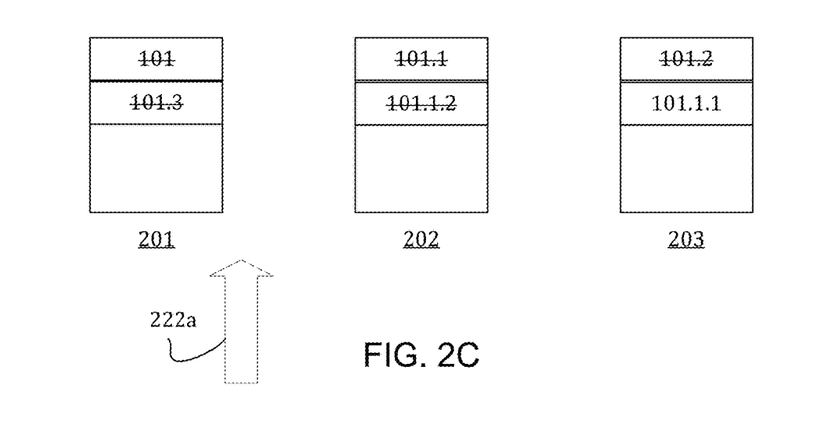
Figure 2D:
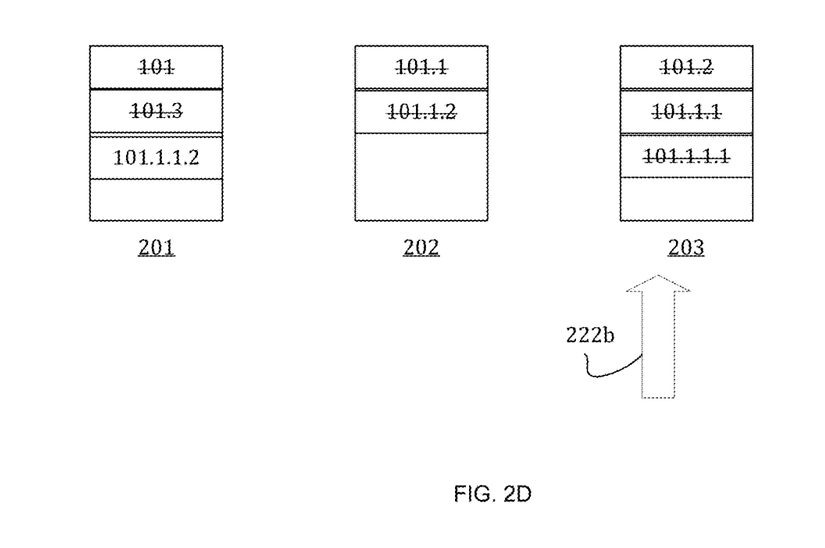

FIGS. 2C and 2D illustrate the states of the queues, upon scanning the queues. The position of the scanning during a cycle is illustrated by an arrow 222*a* and 222*b* at two points in time within the same scanning cycle.

In FIG. 2C, queues 201 and 202 are empty, while queue 203 includes directory 101.1.1. The scanning 222*a* of the queues has just determined that queue 201 is empty. While the scanning continues, the third compute node checks the next hierarchy under 101.1.1, assigns 101.1.1.1 to itself and assigns 101.1.1.2 to queue 201 of the first compute node—as illustrated in FIG. 2D.

Suppose directory 101.1.1.1 is small or empty, the third compute node finishes its work and deletes directory 101.1.1.1 from its queue, as illustrated in FIG. 2D, while directory 101.1.1.2 provides substantial work for the first compute node, and therefore queue 201 is not empty. The scanning 222*b* has already determined that queue 201 is empty, and then determines that queues 202 and 203 are empty. However, by the time the scanner finishes the cycle, queue 201 is not empty. Therefore, there is a need to determine whether a reassignment was made during the scanning cycle, in order to decide whether the traversal is completed.

The check of whether there are non-empty queues may include checking all the queues to determine which queues are not empty, or the check may stop when one queue is determined to be not empty.

Figure 2E:
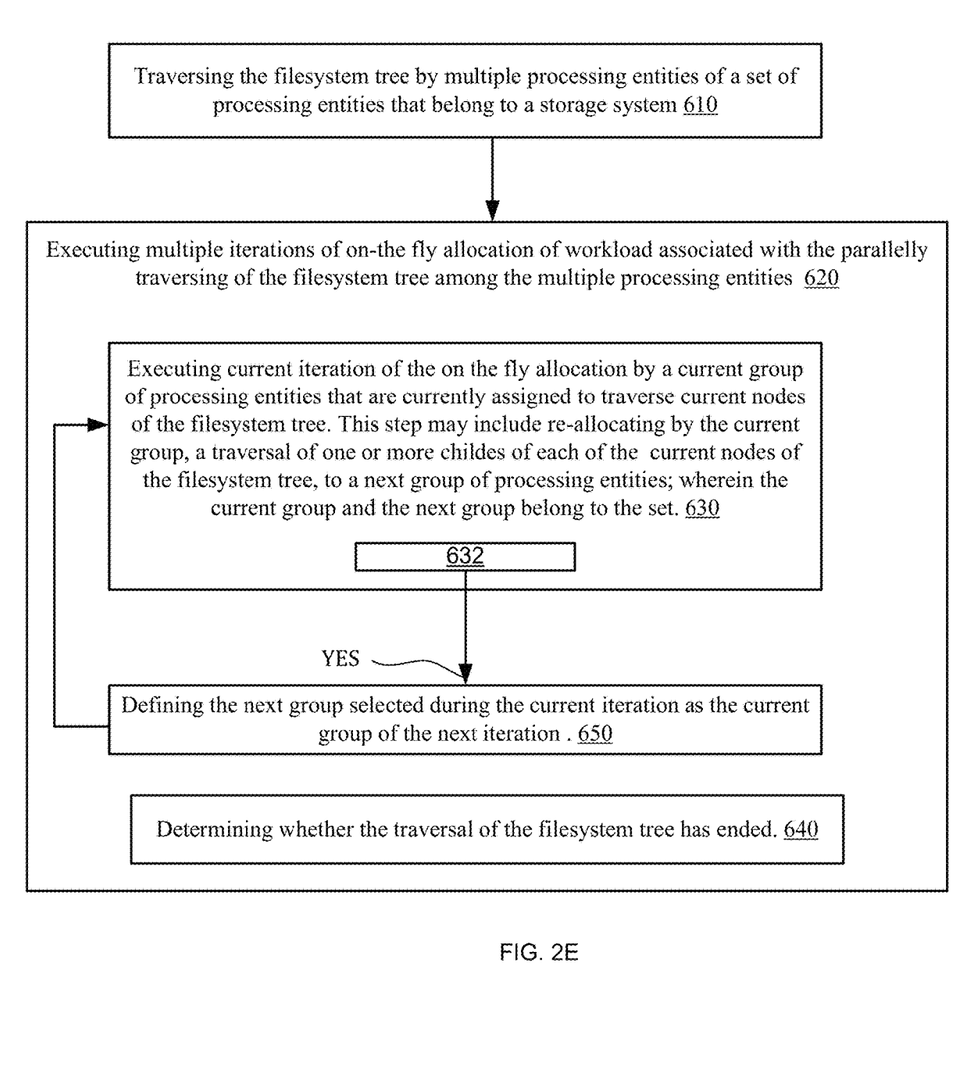

FIG. 2E illustrates method 600 for traversal of a filesystem tree.

Method 600 may include step 610 of traversing the filesystem tree by multiple processing entities of a set of processing entities that belong to a storage system. A processing entity may be a computer node, a part of a compute node, a processor circuit, and the like.

Step 610 may include step 620 of executing multiple iterations of on-the fly allocation of workload associated with the parallel traversing of the filesystem tree among the multiple processing entities. On the fly means that the allocating are not determined before the beginning of step 610.

Step 620 may include steps 630 and 640.

Step 630 may include executing a current iteration of the on the fly allocation.

Step 630 is executed by a current group of processing entities that are currently assigned to traverse current nodes of the filesystem tree, and (b) may include re-allocating, by the current group, a traversal of one or more child nodes of each of the current nodes of the filesystem tree, to a next group of processing entities; wherein the current group and the next group belong to the set.

It is noted that although step 630 is for executing a current iteration, different processing entities of the current group may execute the reallocation of the traversal task at different times or in parallel, depending on the state of the corresponding task queues. The current group may include processing entities selected in a previous iteration, by a certain processing entity to traverse the current nodes, wherein the current nodes may be directories under a certain node being processed by the certain processing entity, during a previous iteration. For example, referring to FIG. 2A, the first compute node that processes directory 101 selects a current group that includes the first, second and the third compute nodes, for traversing the directories 101.3, 101.1 and 101.2, which are referred to herein as the current nodes of the filesystem tree. The child nodes of each of the current nodes may include the directories under 101.3, 101.1 and 101.2.

Step 630 may be repeated multiple times.

Step 630 may include checking (632) whether to perform another repetition—and if so—jumping to step 650 of defining the next group selected during the current iteration as the current group of the next iteration—and jumping to step 630.

Step 640 may include determining whether the traversal of the filesystem tree has ended and if so—ending step 620.

The number and/or the identity of processing entities may differ from one iteration to another or may be the same.

Regarding step 630— a. The re-allocating by the current group may be done in any manner—for example randomly selecting processing entities out of available processing entities of the set.

b. The re-allocating by the current group may be based on estimated workloads of the processing entities of the set.

c. The estimated workloads of the processing entities of the set may be calculated by checking a fullness level of task queues associated with the processing entities of the set.

d. The checking of the fullness level of task queues associated with the processing entities of the set may include accessing one or more shared memory resources that store the task queues. The shared memory resources allow any compute entity to read or change any of the task queues.

e. The on-the fly allocating of the workload may include multiple iterations, wherein a current iteration of the multiple iterations may include re-allocating, by a certain processing entity that is currently assigned to traverse a certain node of the filesystem tree, a traversal task of a child node of the certain node to another processing entity of the set.

f. The re-allocating can be made regardless of any branches that originate from the child of the certain node.

g. The re-allocating may not be conditioned upon knowledge of any branches that originate from the child of the certain node.

Regarding step 640— a. Step 640 may include determining that the traversing of the filesystem tree ended when all members of the set (a) are not scheduled to traverse any part of the filesystem tree, and (b) are not currently traversing any part of the filesystem tree.

b. Step 640 may include checking traversing task queues associated with the members of the set.

c. Step 640 may include searching for reassignment indicators that indicate whether a compute node (even if currently inactive) issued a reassignment after the previous iteration of step 640. If so—at least some other queues of at least some other compute nodes should be evaluated.

It should be noted that the traversal may be performed while executing a storage system operation—and step 610 may also include step 650 of executing the storage system operation—in parallel or during the execution of step 610.

The starting of step 610 is not dependent on a prior knowledge of a full structure of the filesystem tree. Thus— the filesystem tree does not need to be entirely scanned and have its entire structure known in advance.

Method 600 may be executed by compute nodes—and even a vast number of compute nodes. Method 600 may be designed to provide different tradeoffs between one or more operational parameters such as latency, accuracy, communication consumption, and the like. For example—method 600—and especially re-allocation decisions may be executed in a time and communication efficient manner. For example, the decision (made by a compute node) to reallocate a traversal task—may involve accessing a shared memory (for example a non-volatile memory) that stores an indication about the workload of the compute nodes that participate in the traversal (for example—a simple indication such as the fullness level of the queue may be adopted)—and determine to re-allocate the task based at least in part on the workload. The re-allocation may include adding a traverse task to the queue of another compute node—even without explicitly sending a dedicated communication to the compute node that was just assigned another task.

Method 600 may be executed by a storage system. Storage systems may include multiple disks. A storage system may include multiple compute nodes and multiple storage nodes. Nonlimiting examples of compute nodes and storage nodes are illustrated in US patent application 2019/0141128 which is incorporated herein by reference.

Figure 3A:
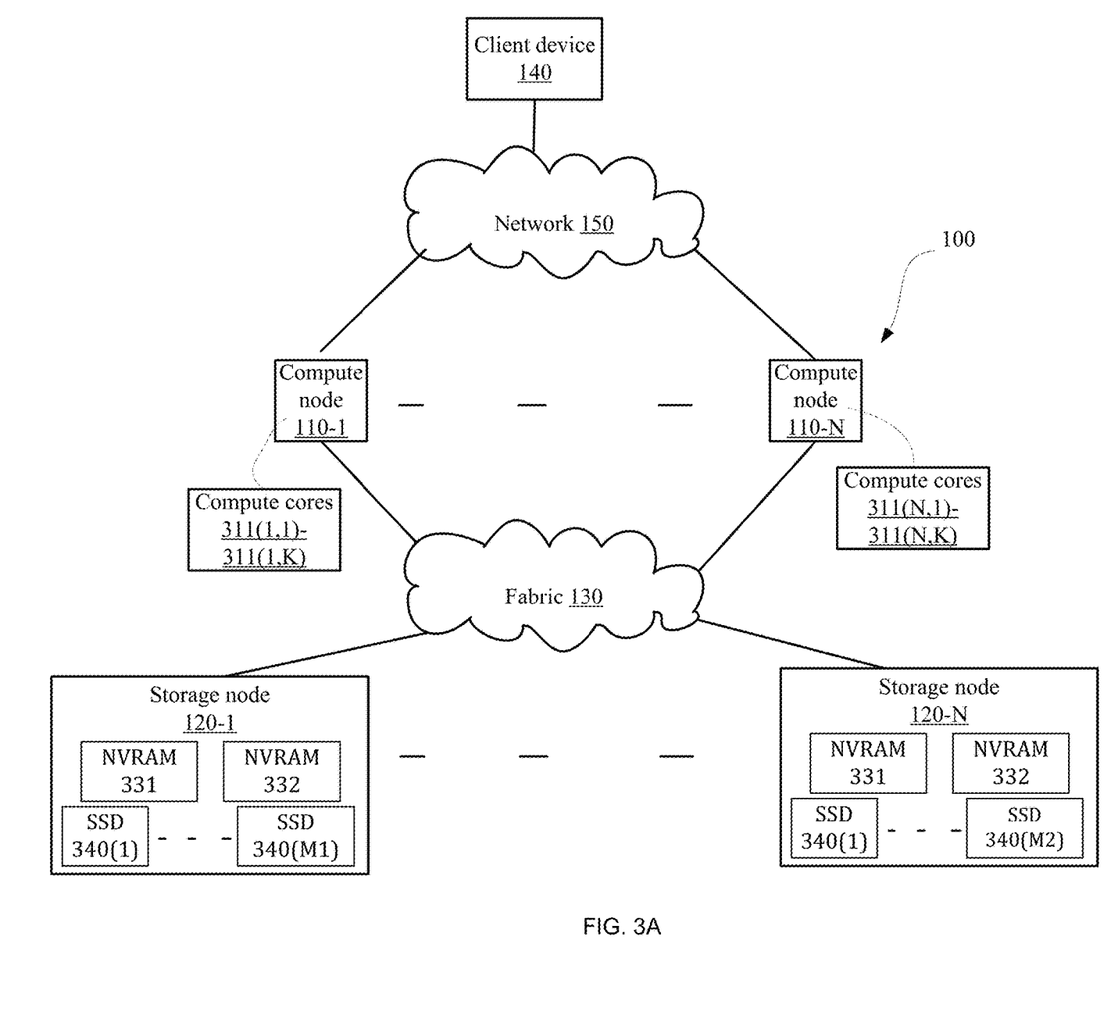
FIG. 3A is an example of a storage system.

FIG. 3A shows an example diagram of a storage system 100 according to the disclosed embodiments.

The storage system 100 includes a number of N compute nodes 110-1 through 110-N (hereinafter referred to individually as a compute node 110 and collectively as compute nodes 110, merely for simplicity purposes, N is an integer equal to or greater than 1). The compute nodes include (or may execute) multiple compute cores each—see for example compute cores 311(1,1)-311(1,K) and compute cores 311(N,1)-311(N,K).

The storage system 100 also includes a number of M storage nodes storage node 120-1 through 120-M (hereinafter referred to individually as a storage node 120 and collectively as storage nodes 120, merely for simplicity purposes, M is an integer equal to or greater than 1). The computer nodes 110 and the storage nodes 120 are connected through a communication fabric 130. M may equal N or may differ from N.

In an embodiment, a compute node 110 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 110 does not require any dedicated hardware A compute node 110 is configured to perform tasks related to the management of the storage nodes 120, such as a filesystem tree traversal. In an embodiment, each compute node 110 interfaces with multiple client devices such as a client device 140 (or an application installed therein) via a network 150. To this end, a compute node 110 is configured to receive requests (e.g., read or write requests) and promptly serve these requests in a persistent manner. The network 150 may be, but is not limited to, the Internet, the world-wide-web (WWW), a local area network (LAN), a wide area network (WAN), and the like.

In an embodiment, a compute node 110 is configured to interface with different protocols implemented by the client devices or applications (e.g., TCP/IP, HTTP, FTP, various filesystem protocols, etc.) and to manage the read and write operations to the storage nodes 120. The compute node 110 is further configured to translate the protocol commands into a unified structure (or language). Then, each compute node 110 is also configured to logically address and map all elements stored in the storage nodes 120.

Further, each compute node 110 may maintain the logical operations of elements and the relationships between the elements (for example, directory trees) and an element attribute (e.g., metadata) via state stored on the storage nodes 120. An element may include a file, a directory, an object, and the like. The mapping and addressing of the elements allow the compute node 110 to maintain the exact physical locations of the elements in the storage nodes 120.

In an embodiment, to efficiently read and write data to the storage nodes 120 from the physical layer, each compute node 110 performs a number of processes including data reduction, data resiliency, and Flash memory management actions (e.g., defrag, wear leveling, and so on).

It should be noted that each compute node 110 may operate in the same manner as all other compute nodes 110. In a case of a failure, any compute node 110 can replace the failed node. Further, each compute node may control and manage one or mode storage nodes 120 regardless of the specific architecture of the storage nodes 120. Therefore, there is no coupling between specific compute nodes 110 and specific storage nodes 120. As such, compute nodes can be added to the system 100 without increasing the number of storage nodes (or their capacity), and vice versa, storage nodes can be added without increasing the number of compute nodes 110.

The storage nodes 120 provide the storage and state in the system 100. To this end, each storage node 120 may include a plurality of SSDs, such as SSDs 340, for example storage node 120-1 includes M1 SSDs 340(1)-340(M1). Each storage node further includes fast accessed memory for storing the traversal task queues, such as NVRAM 331 and 332 of FIG. 3A. The traversal task queues may be stored in either a volatile memory or non-volatile memory within the storage node.

The storage nodes 120 may be configured to have the same capacity as each other or different capacities from each other. In an embodiment, the data stored in each storage node 120 is made redundant internally within the storage node, made redundant at a different storage node, or both.

A storage node 120 may be configured to communicate with the compute nodes 110 over the communication fabric 130. It should be noted that each compute node 110 can communicate with each storage node 120 over the communication fabric 130. There may not be a direct coupling between a compute node 110 and storage node 120.

In the embodiment, the communication fabric 130 may include an Ethernet fabric, an InfiniBand fabric, and the like. Specifically, the communication fabric 130 may enable communication protocols such as, but not limited to, remote direct memory access (RDMA) over Converged Ethernet (RoCE), iWARP, Non-Volatile Memory Express (NVMe), and the like. It should be noted that the communication protocols discussed herein are provided merely for example purposes, and that other communication protocols may be equally utilized in accordance with the embodiments disclosed herein without departing from the scope of the disclosure.

It should be noted that in one example deployment, the client device 140 is part of a compute node 110. In such a deployment, the system 100 does not communicate with an external network, e.g., the network 150. It should be further noted that the communication between the compute nodes 110 and the storage nodes 120 is facilitated over the fabric 130. It should be further noted that the compute nodes 120 can communicate with each other over the fabric 130. The fabric 130 is a shared fabric.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for traversal of a filesystem tree, the method comprises:
   traversing the filesystem tree by multiple processing entities of a set of processing entities that belong to a storage system;
   wherein the traversing comprises multiple iterations of on-the fly allocation of workload, associated with parallel traversing of the filesystem tree, among the multiple processing entities;
   wherein each current iteration of the multiple iterations (a) is executed by a current group of processing entities that were assigned, during a previous iteration of the multiple iterations, to traverse current nodes of the filesystem tree, and (b) comprises allocating by the current group, a traversal task for traversing one or more child nodes of each of the current nodes of the filesystem tree, to a next group of processing entities, wherein the one or more child nodes are related to one or more directories that reside under each of the current nodes; wherein the current group and the next group belong to the set.

2. The method according to claim 1 wherein at least a starting of the traversing of the filesystem tree is not dependent on a prior knowledge of a full structure of the filesystem tree.

3. The method according to claim 1 wherein the allocating by the current set comprises randomly selecting processing entities out of available processing entities of the set.

4. The method according to claim 3 wherein the allocating by the current set is based on estimated workloads of the processing entities of the set.

5. The method according to claim 3 wherein the estimated workloads of the processing entities of the set are calculated by checking a fullness level of task queues associated with the processing entities of the set.

6. The method according to claim 5 wherein the checking of the fullness level of task queues associated with the processing entities of the set comprises accessing one or more shared memory resources that store the task queues.

7. The method according to claim 1 wherein the allocating is made regardless of any branches that originate from the one or more child nodes of each of the current nodes.

8. The method according to claim 1 wherein the allocating is not conditioned upon knowledge of any branches that originate from the one or more child nodes of each of the current nodes.

9. The method according to claim 1 comprising periodically checking a status of the traversing of the filesystem tree and determining that the traversing ended when (a) no member of the set raised a reassignment indication since a previous checking of the status, wherein the reassignment indication indicates that assignment of a traversal task to another member was performed since the previous checking, and (b) no member of the set is currently traversing any part of the filesystem tree.

10. The method according to claim 1 comprising checking traversing task queues associated with the members of the set.

11. A non-transitory computer readable medium for traversing a filesystem tree, the non-transitory computer readable medium stores instructions for: traversing the filesystem tree by multiple processing entities of a set of processing entities that belong to a storage system; wherein the traversing comprises multiple iterations of on-the fly allocation of workload associated with the parallelly traversing of the filesystem tree among the multiple processing entities; wherein each current iteration of the multiple iterations (a) is executed by a current group of processing entities that were assigned, during a previous iteration of the multiple iterations, to traverse current nodes of the filesystem tree, and (b) comprises allocating by the current group, a traversal of one or more child nodes of each of the current nodes of the filesystem tree, to a next group of processing entities, wherein the one or more child nodes are related to one or more directories that reside under each of the current nodes; wherein the current group and the next group belong to the set.

12. The non-transitory computer readable medium according to claim 11 wherein at least a starting of the traversing of the filesystem tree is not dependent on a prior knowledge of a full structure of the filesystem tree.

13. The non-transitory computer readable medium according to claim 11 wherein the allocating by the current set comprises randomly selecting processing entities out of available processing entities of the set.

14. The non-transitory computer readable medium according to claim 13 wherein the allocating by the current set is based on estimated workloads of the processing entities of the set.

15. The non-transitory computer readable medium according to claim 13 wherein the estimated workloads of the processing entities of the set are calculated by checking a fullness level of task queues associated with the processing entities of the set.

16. The non-transitory computer readable medium according to claim 15 wherein the checking of the fullness level of task queues associated with the processing entities of the set comprises accessing one or more shared memory resources that store the task queues.

17. The non-transitory computer readable medium according to claim 11 wherein the allocating is made regardless of any branches that originate from the one or more child nodes of each of the current nodes.

18. The non-transitory computer readable medium according to claim 17 wherein the allocating is not conditioned upon knowledge of any branches that originate from one or more child nodes of each of the current nodes.

19. The non-transitory computer readable medium according to claim 11 that stores instructions for determining that the traversing of the filesystem tree ended when all members of the set (a) are not scheduled to traverse any part of the filesystem tree, and (b) are not currently traversing any part of the filesystem tree.

20. The non-transitory computer readable medium according to claim 11 that stores instructions for checking traversing task queues associated with the members of the set.

21. A storage system the comprises a controller, a memory unit and multiple disks; wherein the controller is configured to: traversing a filesystem tree by multiple processing entities of a set of processing entities that belong to the storage system; wherein the traversing comprises multiple iterations of on-the fly allocation of workload, associated with parallel traversing of the filesystem tree, among the multiple processing entities; wherein a each current iteration of the multiple iterations (a) is executed by a current group of processing entities that were assigned, during a previous iteration of the multiple iterations, to traverse current nodes of the filesystem tree, and (b) comprises allocating by the current group, a traversal task for traversing one or more child nodes of each of the current nodes of the filesystem tree, to a next group of processing entities, wherein the one or more child nodes are related to one or more directories that reside under each of the current nodes; wherein the current group and the next group belong to the set.

* * * * *